C. W. SALADEE.
Torsion Spring for Vehicles.
No. 8,135. Reissued March 26, 1878.
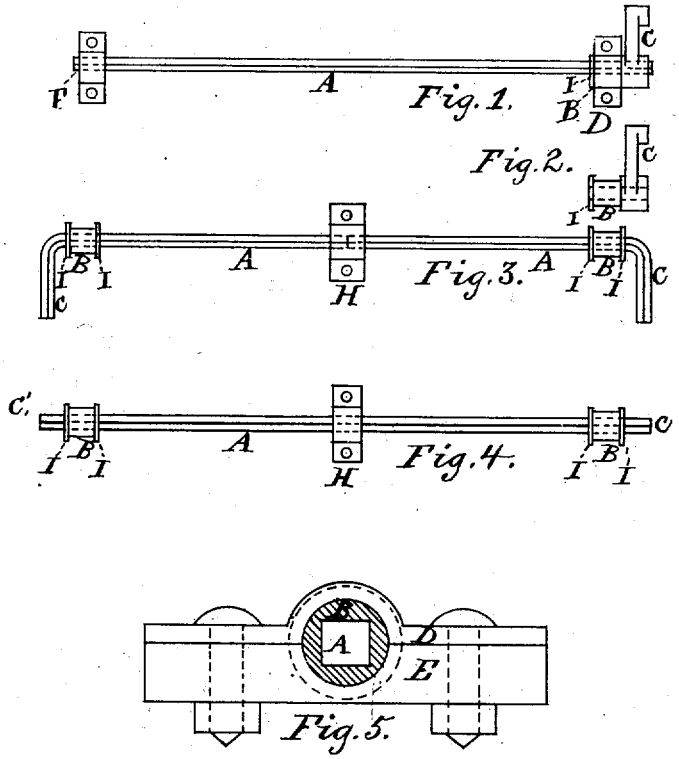
Attest:
A. Benjamin
F. M. Burnham
Inventor
C. W. Saladee
by his Attorney
Chas. E. Foster
H. PETERS, PHOTO-LITHOGRAPHER, WASHINGTON, D. C.

UNITED STATES PATENT OFFICE.

CYRUS W. SALADEE, OF WOLCOTTVILLE, CONNECTICUT.

IMPROVEMENT IN TORSION-SPRINGS FOR VEHICLES.

Specification forming part of Letters Patent No. 132,695, dated October 29, 1872; Reissue No. 7,855, dated August 21, 1877; Reissue No. 8,135, dated March 26, 1878; application filed March 13, 1878.

*To all whom it may concern:*

Be it known that I, C. W. SALADEE, of Wolcottville, Litchfield county, Connecticut, (formerly of Washington, D.C.,) have invented an Improvement in Torsion-Springs for Vehicles, of which the following is a specification:

The nature of my invention consists in the employment of angular rods or bars of steel for torsional springs, and in the peculiar construction and application of the springs, as hereinafter more fully shown and described; and has for its object, first, greater strength to a given size of steel as compared with round rods; and, further, to simplify and cheapen the preparation of torsional springs, and to produce efficient torsional springs capable of ready application.

In the drawing which forms part of this specification, Figure 1 is a top view, showing one mode of constructing a spring of angular steel. Fig. 2 is a side elevation of the crank seen in Fig. 1, showing the sleeve B as part of the crank. Fig. 3 is a top view of a modification. Fig. 4 is a top view of another modification, and Fig. 5 is an enlarged side elevation of the "split box" in which the loose sleeve B finds its bearing.

Where an angular rod is reduced to a circular form to fit its bearing, if the torsional strength of the cross-area of the steel is calculated and relied upon, it would be found too weak at the point of the round bearing, and would then be strained out of its normal position or broken; but if the angular rod could be so applied as to maintain the flat faces throughout its entire length, rods of this form would in all cases be preferable to round ones in every respect, greater strength would be secured, and the cost of manufacture greatly reduced.

To obviate the objection above referred to, of turning the required round bearing at or near the lever ends of the angular rod, I provide a flanged sleeve, B, or its equivalent, of the requisite diameter to admit of passing the angular rod A through its center, and the cylindrical journal B rests in the split box D E, Figs. 1 and 5. So, also, the opposite end of the rod in Fig. 1 passes through the fixed attachment or bearing F, where it is rigidly held in position, while the flanged sleeve B is permitted free action in its bearings.

It will thus be seen that, when cut off to the right length and properly tempered, the angular rod is ready for application.

In Fig. 1 the sleeve or journal B is cast or formed solid with the crank C; but, if preferred, it is made separate from and independent of the crank, as in Figs. 3 and 4, and the lever arm or crank may either be formed out of the ends of the rod, as in Fig. 3, or a crank may be fitted to the square ends C′, Fig. 4, after passing through the sleeve B.

Fig. 5 shows the sleeve B in section, with the outer flange I removed, while the inside flange is represented by the circular dotted line in position in its bearing, with a square hole pierced through its center to receive the full size of the angular rod A.

In the first modification, Fig. 1, the rod extends its full length across to the attachment or bearing F, where it is rigidly held, as before described. This gives greater torsional action than in the remaining two other modifications by reason of its great length. When, however, such extended action is not required, the rod may have its bearings at each end, with a supplemental central attachment or bearing at H, from which the twist or torsional action extends in opposite directions to both ends whenever the cranks or the attachment H are turned to twist the longitudinal or torsional portion or member of the spring.

The drawing shows in dotted lines, Fig. 3, the spring divided at its center, the ends of the two sections butting together within the attachment H—a construction which permits the application of the loose sleeves B after the bending of the sections to form the arms C′.

Apart from the simplicity and cheapness of the spring formed by bending the ends to form the lever-arms C, great strength is secured, as the welding or other modes of securing separate arms is always objectionable, and liable to imperfections, weakening the whole structure.

A most important feature of this construction is the placing of both arms at one side and bending or twisting the straight body or torsional portion on opposite sides of the bearing or attachment H in opposite directions with greater resistance than would otherwise result, this construction and form of spring being economical, effective, and capable of ready application.

I will here state that it is my purpose to employ angular torsional springs on the plan of my invention in wheeled vehicles of every class and kind, and for other purposes where the same is applicable and desirable.

I claim as my invention—

1. A torsional spring composed of an angular rod of steel, of substantially uniform size and shape throughout the entire length, including the bearings, as and for the purpose set forth.

2. A torsional spring of angular steel, uniform in size and shape at the bearings with the body of the spring, or nearly so, and having a central attachment, from which the twist extends in opposite directions, substantially as set forth.

3. A torsional spring consisting of the central straight body A, extended to form the arms C at right angles to the body on the same side, and provided with a central attachment, secured immovably upon the spring, and from which the spring is twisted toward each end, substantially as set forth.

4. A torsional spring having a straight body and two arms on the same side, each a continuation of the body, as set forth.

5. A torsional spring composed of an angular rod of steel extending through a cylindrical bearing, substantially as set forth.

6. The loose sleeve-bearing B for supporting and operating angular torsional springs, substantially as and for the purpose set forth.

In testimony whereof I have signed my name to this specification in the presence of two subscribing witnesses.

CYRUS W. SALADEE.

Witnesses:
JOHN W. BROOKS,
C. L. MCNEIL.